March 4, 1969  H. E. VENUS  3,430,301

CUPBOARD HOOK

Filed July 17, 1967

*INVENTOR*
HELLEN E. VENUS
BY

United States Patent Office 3,430,301
Patented Mar. 4, 1969

3,430,301
CUPBOARD HOOK
Hellen E. Venus, R.F.D. 3, David City, Nebr. 68632
Filed July 17, 1967, Ser. No. 653,758
U.S. Cl. 24—73        4 Claims
Int. Cl. A44b 21/00; A47g 1/16

ABSTRACT OF THE DISCLOSURE

A hook having its shank and its lower portion disposed in the same plane as those upper portions of the hook which are offset to at least one side of said shank, for mailing in a flat envelope.

---

The material of the shank being of a size such that an operator, by gripping the upper and lower poritions of the hook in his fingers, can twist the shank until the terminal end section of its lower portion is disposed in a plane at 90 degrees to the plane of the remainder of the hook.

This invention is in the field of small hooks such as can be used to support pieces of paper such as notes and recipes and which can be attached to the inside of a door of a kitchen cabinet or the backside of a closet door or to a wall.

In the prior art, hooks have commonly been either with their lower portions disposed at a right angle to the plane in which the eye of the hook lies, as would not be suitable for my purpose, or else, they have been made with the eye of the hook lying in the same plane with the lower portion of the hook but with the shank of the hook so strong as not to be conveniently twistable by the fingers of an operator, since they were never designed for such a purpose.

It is the object that the hook of this invention be sold through delivery through the mails in an envelope in a substantially flat form, that is, lying in a single plane. Upon receiving the hook, an operator then can twist the lower portion of the hook so that it lies in a plane at a right angle to the plane of the upper portion of the hook for disposing the hook in an operational position for protruding outwardly from a wall surface.

A hook assembly of this invention is generally indicated at 10 having a hook 12 having a normally downwardly extending shank portion 20.

The hook 12 has an upper portion generally indicated at 30 at the upper end of the shank 20.

At least a part of the upper portion 30 as seen at 32 is attached to the shank 20 at 36.

Figure 2:
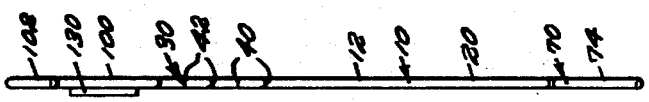
FIGURE 2 shows the hook assembly of FIGURE 1 as seen from the right-hand side thereof.

Parts 40 and 42 of the upper portion 30 are offset to at least one side of the shank and the offset parts 40 and 42 are generally parallel to a single plane, as best seen in FIGURE 2.

The parts 40 and 42 preferably form parts of a serpentine portion of a hook, as generally indicated at 50. The various parts of the serpentine portion 50 preferably extend both to the right and to the left of the shank 20.

The hook has a lower portion 70 attached to the shank portion 20 and provided with an upturned terminal end section 72 disposed inclining upwardly and outwardly from the shank portion 20 in a direction such that the lower portion 70 and the shank 20 lie parallel to and substantially within the same plane as occupied by the offset portions 40 and 42 of the serpentine part 50.

Figure 4:
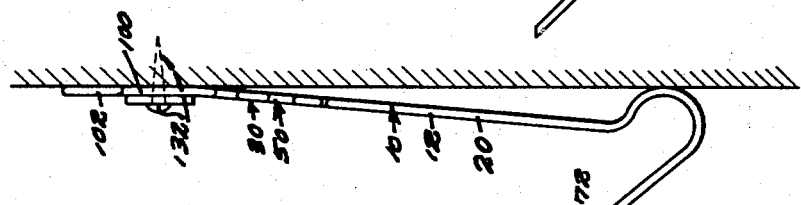
FIGURE 4 shows the hook as formed in the shape of FIGURE 3 attached to a wall.
Figure 3:
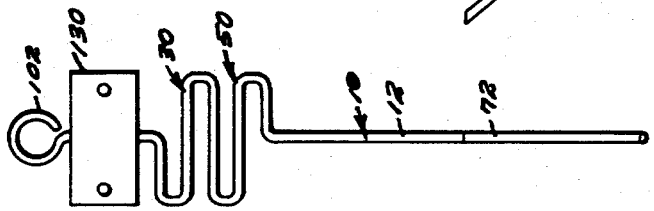
FIGURE 3 shows the hook of FIGURE 1 after an operator has twisted its shank so that its lower portion is at a right angle to its upper portion.

Between the upturned terminal end section 72 and the shank 20 lies a loop portion 74 of the lower portion 70, which latter is preferably disposed partly on the opposite side of the shank 20 from the terminal end section 72 to provide a position along the hook which is adapted to be gripped by an operator between the thumb and index finger while the operator holds the serpentine portion 50 of the hook between the thumb and index finger of the other hand so that the shank 20 can thereby be conveniently twisted into the position such that the lower portion 70 is disposed at a right angle to the plane of the remainder of the hook or, in other words, into the position shown in FIGURES 3 and 4.

This is made possible because the shank 20 is formed of a malleable material, preferably metal, and because the shank 20 is of a size such that finger-gripping as described is sufficient for the operator to conveniently twist the shank as described.

Above the serpentine portion 50 is an elongated portion 100 disposed substantially parallel to the shank 20 and which extends upwardly being connected at its upper end to an eye 102, which latter also lies within the same plane as the serpentine portion 50.

In attaching the hook to a wall 120, as shown in FIGUE 4, a small strap 130 can be placed across the upwardly extending portion 100 of the hook and nails or other means 132 can be inserted through holes 134 on each side of the hook portion 100, the nails being inserted into the wall 120.

As thus described, the terminal end section 72 will project outwardly from the wall in a convenient position for receiving notes, bills, pieces of paper, and also recipes.

Figure 5:
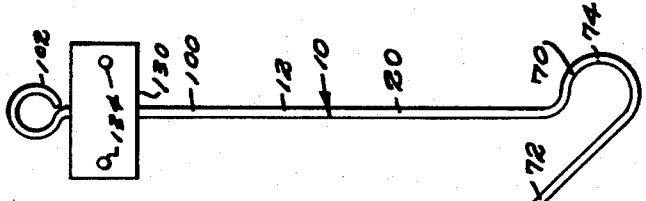
FIGURE 5 shows a modification of the hook of FIGURE 1 in a substantially planar form for shipping.

Referring to FIGURE 5, a modification of the invention is there shown in which all similar parts bear similar numerals to avoid a duplication of description.

Figure 1:
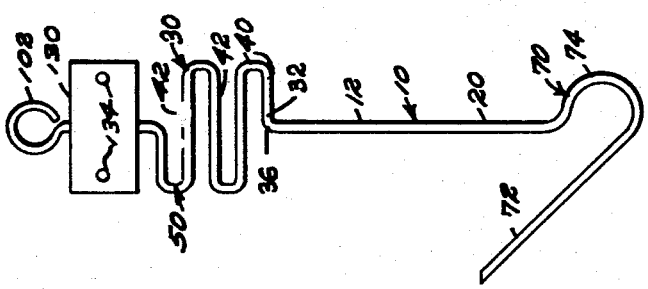
FIGURE 1 is a frontal elevation of the hook of this invention shown in a substantially planar position for shipping.

The hook of FIGURE 5 is similar to the hook of FIGURE 1 with the single exception that the serpentine portion 50 with its offset portions 40 and 42 is absent and the upwardly extending portion 100 thereof is connected directly to the shank 20.

As thus described it is believed that this invention provides a superior hook for this purpose and fulfills the objectives above set forth.

I claim:

1. A hook (12) having a normally downwardly extending shank portion (20), said hook having an upper portion (30) at the upper end of said shank (20), at least a part (32) of said upper portion being attached to said shank, parts (40, 42) of said upper portion (30) being offset to at least one side of said shank and said offset parts being generally parallel to a single plane, a lower portion (70) attached to said shank portion and provided with an upturned terminal end section (72) disposed inclining both upwardly and outwardly from said shank portion in a direction such that said lower portion and said shank lie parallel to and substantially within the said single plane of said offset portions, said lower portion, said shank and at least a part of said upper portion, all being formed of a single piece of malleable material, the material of said shank being of a size such that an operator by gripping said upper and lower portions in his fingers can conveniently twist said shank until said terminal end section is disposed in a plane at 90 degrees to said first mentioned plane.

2. The combination of claim 1 in which those parts (42) of said upper portion (30) which are offset to at least one side of said shank form parts of a serpentine portion of the hook which latter is formed integrally of the same piece of material as the shank.

3. The combination of claim 1 in which said shank (20) and said upturned end section (72) are interconnected by a portion (74) which extends to the opposite side of said shank from said upturned end section (72).

4. The combination of claim 1 in which all parts of said hook are formed integrally of the same elongated piece of material.

References Cited

UNITED STATES PATENTS

| | | | |
|---|---|---|---|
| 1,039,367 | 9/1912 | Dehn | 248—489 |
| 1,841,061 | 1/1932 | Sarkisian. | |
| 2,059,618 | 11/1936 | Swayne | 24—73 |
| 2,606,730 | 8/1952 | Bryn | 248—497 |

DONALD A. GRIFFIN, Primary Examiner.

U.S. Cl. X.R.

248—489